United States Patent [19]

Talbot

[11] 3,729,949
[45] May 1, 1973

[54] REFRIGERANT CHARGING CONTROL UNIT
[76] Inventor: Jack James Talbot, 430 West Doren Terrace, Vineland, N.J. 08360
[22] Filed: Dec. 6, 1971
[21] Appl. No.: 205,184

[52] U.S. Cl. .................62/149, 62/292, 62/126, 62/127, 62/129, 62/77
[51] Int. Cl. ............................................F25b 45/00
[58] Field of Search...................62/149, 174, 126, 62/127, 129, 77, 292

[56] References Cited
UNITED STATES PATENTS

| | | | |
|---|---|---|---|
| 2,499,170 | 2/1950 | Shoemaker | 62/292 |
| 2,689,463 | 9/1954 | Arf | 62/149 |
| 2,893,217 | 7/1959 | Nigro | 62/126 |
| 3,303,663 | 2/1967 | Miller | 62/149 |
| 3,400,552 | 9/1968 | Johnson | 62/149 |

Primary Examiner—William J. Wye
Attorney—Arthur H. Seidel et al.

[57] ABSTRACT

Movable switch elements responsive to temperature and pressure control the operation of a refrigerant charge unit during charging.

1 Claim, 2 Drawing Figures

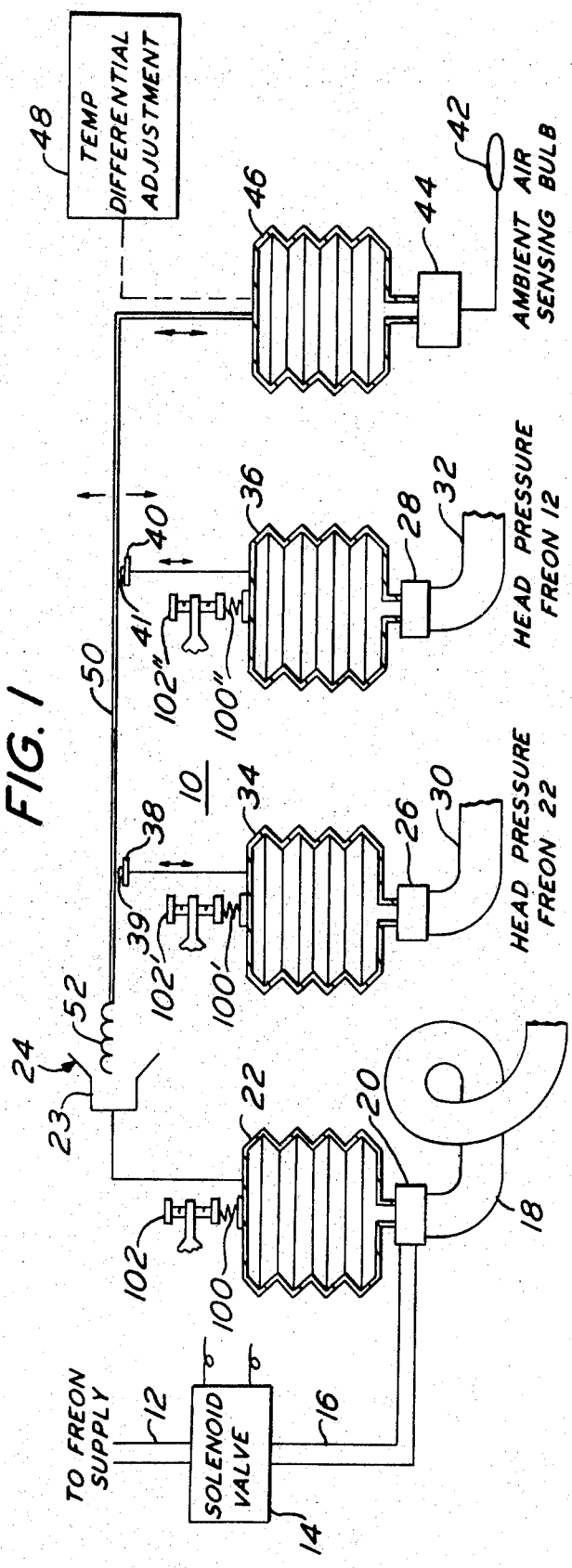

3,729,949

REFRIGERANT CHARGING CONTROL UNIT

This invention relates to an apparatus for automatically charging refrigerant into an air conditioning or refrigeration system. More particularly, this invention relates to an apparatus having movable switch elements affixed to bellows responsive to pressure and temperature for determining the proper operation of a refrigerant charging unit.

The charging of any refrigeration system, such as an air conditioner, is a rather complex procedure, particularly when done in the field. It is a necessary procedure, however, since refrigeration systems of any kind often lose refrigerant due to damage or other conditions. It is therefore necessary, after repair, to recharge the system. All such charging procedures must be done at the site of the unit where conditions, such as ambient air temperature, vary. The present invention seeks to reduce the complexity inherent in charging such systems.

All refrigeration charging systems require varying unknown amounts of refrigerant. Since the refrigerant, normally freon, is a liquid gas under pressure, the charging of such liquids into an empty or partially filled system to correct quantity requires careful calibration depending upon ambient air temperature, pressure and other well known gas characteristics. Because the charging time is rather lengthy, there is always the possibility, and indeed the probability, of a change in ambient air temperature. Moreover, defects in the system may not be immediately apparent. Therefore, the normal procedure requires constant observation of pressure and temperature characteristics during the charging operation so that adjustments can be made. It is therefore a time consuming and therefore costly procedure.

The present invention provides a means whereby the charging operation may be automatically monitored without personal observation of the system. Thus, the present invention involves a novel means whereby pressure and temperature are constantly sensed and the system is shut down should the variations in such pressure and temperature exceed acceptable limits.

In accordance with the present invention, pressure and temperature are sensed and used to control expansible devices, such as bellows. The bellows are mechanically connected to switch devices. Should the expansion or contraction of the bellows connected to the switch devices be in accordance with predetermined settings, then the system continues to charge. If, however, the bellows causes the switch devices to move out of proper relationship to each other, then a switch is closed and the system shut down. In addition, an alarm may be sounded.

For the purpose of illustrating the invention, there is shown in the drawings a form which is presently preferred; it being understood, however, that this invention is not limited to the precise arrangements and instrumentalities shown.

FIG. 1 is a schematic drawing of the operation of the switch elements.

FIG. 2 is a schematic circuit diagram which may be used in association with mechanical elements shown in FIG. 1.

Referring now to the drawing in detail, wherein like numerals indicate like elements, there is shown in FIG. 1 apparatus designated 10 for monitoring the application of freon into a refrigeration system (not shown).

It is assumed that a conventional refrigeration system is being charged, whether it be an air conditioner or refrigerator. Such refrigeration systems all consist essentially of the same elements including: an evaporator coil, a compressor, a condensing coil, and a liquid expansion valve or capillary tube. Since such refrigeration system elements are conventional, it is not believed necessary to illustrate them. Instead, only the apparatus for monitoring the addition of refrigerant into the system which forms a part of this invention is illustrated.

Generally, it is desirable to monitor the addition of freon or any other refrigerant from the source or supply which may be a supply tank. Thus, freon from a freon supply (not shown) is fed through the tubing 12, the off-on solenoid control valve 14, tubing 16, to the suction side of the refrigeration system through tubing 18.

Suction pressure is measured by a conventional pressure gauge 20 which also controls the expansion or contraction of bellows 22 as a direct indication of the amount of pressure. Thus, the bellows expands or contracts as pressure is increased or decreased. Such bellows type indicators of pressure are well known in the art and therefore need not be described in detail. Bellows 22 expands against spring 100 whose tension is set by adjustment screw 102. Thus, adjustment screw 102 provides a means for precalibrating the bellows 22.

Mechanically connected to the bellows 22 is one contact 23 of the solenoid control switch 24. Contact 23 comprises a hollow conductive member having a bell-like conical opening.

A pressure sensing device in the form of pressure gauge 26 is connected to the high or head pressure side of the compressor. Pressure gauge 26 senses the head pressure in the system. The apparatus illustrated in FIG. 1 is provided with a similar pressure sensing device in the form of pressure gauge 28 which is adapted to be connected to the high or head pressure side of a compressor. Head pressure sensing gauge 26 is for use in a system which operates with freon 22. Head pressure sensing device 28 is for use with a refrigeration system which uses freon 12. Both freon 12 and freon 22 are well known refrigerants which need not be described in detail. Obviously, pressure sensing gauges 26 and 28 are used in the alternative. Pressure sensing gauge 26 is connected to the high pressure side of the compressor by tubing 30. Pressure sensing gauge 28 may be connected to the high pressure side of the compressor by tubing 32.

Bellows 34 is connected to pressure gauge 26 in the same manner as bellows 22 is connected to pressure gauge 20. Thus, bellows 34 expands and contracts in direct proportion to the head pressure sensed by gauge 26. Calibration device consisting of compression spring 100' and adjustment screw 102' is provided for calibrating bellows 34.

Bellows 36 is connected to the head pressure sensing gauge 28. Bellows 36, like bellows 34, expands and contracts in direct proportion to the head pressure sensed by gauge 28. Calibration means for bellows 36 in the form of compression spring 100'' and adjustment screw 102'' is provided.

Normally closed microswitch 38 is mechanically connected to bellows 34. Normally closed microswitch 40 is mechanically connected to bellows 36. As thus connected, microswitches 38 and 40 move together with the surface of the bellows to which they are connected; that is to say they move toward and away from arm 50.

Ambient air sensing bulb 42 for sensing the ambient air adjacent the refrigeration system during the charging operation is also provided. Sensing bulb 42 is connected to transducer 44 which operates to expand and contract bellows 46 in response to changes in ambient air temperature. Bellows 42 is calibrated by the temperature differential adjustment mechanism 48 which moves the operative surface of the bellows to the correct starting position depending upon ambient air temperature.

Arm 50 is mechanically connected to bellows 46, as shown. It therefore moves with bellows 46 as it expands and contracts in direct proportion to any change in ambient air temperature. As illustrated, it moves up and down in the plane of FIG. 1. Affixed to the end of arm 50 is a helical spring like switch contact 52 that is positioned inside the conical portion of contact 23. Thus contacts 23 and 52 define switch 24.

From the foregoing, it should be apparent that contact 23 and contact 52 make or not make electrical connection depending upon the relative movement of the respective bellows 22 and 46 to which they are affixed. For example, if they are out of contact at the commencement of the operation and both bellows 22 and 46 expand, no electrical contact is made. If, on the other hand, bellows 22 expands at a greater rate than bellows 46, then at some point in time contacts 23 and 52 will physically make electrical contact. The same would be true if one of the bellows 22 or 46 contracted while the other expanded.

Arm 52 is made of a rigid material, such as plastic or steel that extends directly over microswitches 38 and 40. Should bellows 34 or 36 expand due to an increased head pressure, then their respective microswitches 38 and 40 would move their actuators 39 and 41 against arm 50. Since microswitches 38 and 40 are normally closed, such movement opens the switches and the electrical circuit in which they are connected.

In accordance with the present invention, the completion of a circuit by contact between contacts 23 and 52 or the opening of a circuit by microswitches 38 and 40 is used to control or otherwise provide signal alarms for the monitoring of the refrigerant charging system. Thus, a means for sensing temperature and pressure during the charging of a refrigeration system, including an air conditioner, is provided.

Referring now to FIG. 2, there is shown a schematic drawing of a circuit for controlling and monitoring a refrigerant charging system. As shown, the circuit illustrated in FIG. 2 includes means for connecting it to a source of electrical power (not shown). A single pole single throw master switch 54 is provided. Switch 54 is connected in circuit with contact 52 of switch 24. Contact 23 is connected to alarm light 58 which in turn is connected to the other side of the source. Thus, should switch 24 close, then light 58 will be illuminated. It should be understood, however, that light 58 is illustrative of the form of alarm which may be used. If desired, a sound form of alarm such as a bell or siren could be used in place of or in addition to light 58.

It should be apparent from the foregoing that should ambient air temperature or suction line pressure vary relative to each other such that switch 24 is closed, an alarm will be excited. Thus, the system provides a means for monitoring the relationship between suction pressure and ambient air temperature during charging.

Single pole double throw switch 60 provides a means for selecting whether microswitch 38 used when charging freon 22 or microswitch 40 used when charging freon 12 is in the electrical circuit. As shown, microswitch 38 is connected in circuit with relay 110 which in turn is connected to solenoid valve 14. Relay 110 controls the operation of warning light 62 which also may be referred to as a "full charge" light. In a like manner, microswitch 40 is connected to relay 112 which controls the operation of warning light 64. Relay 112 is also connected in circuit with solenoid valve 14.

Solenoid valve 14 is connected to master switch 54 as shown.

From the foregoing, it should be apparent that the opening of microswitch 38, as by contact arm 50, will de-energize relay 110 and also disconnect the circuit through solenoid valve 14. The de-energization of relay 110 permits light 62 to be illuminated. The de-energization of solenoid valve 14 stops the flow of freon into the system.

In a like manner, should switch 60 be connected to microswitch 40, the opening of such switch de-energizes relay 112 and also solenoid valve 14. The de-energization of relay 112 permits light 64 to be illuminated. The de-energization of solenoid valve 14 stops the flow of freon into the system.

From the foregoing, it should be apparent that microswitches 38 and 40 provide a means whereby an increase in head pressure of any significant amount is indicated by de-energizing the solenoid valve 14 to close off the freon supply. Moreover, the occurrence of this event is indicated by a warning light. It should be understood that the warning lights 62 and 64 are exemplary. Thus, other alarm systems such as a bell or whistle could be provided.

Relay 120 is connected in circuit with the source of electrical power. Relay 120 is responsive to liquid sensing bulb 122. Thus, relay 120 normally maintains the compressor in on condition provided that bulb 122 senses no liquid. Should bulb 122 sense liquid, then relay 122 opens the circuit to the compressor and simultaneously lights the warning light 124. Liquid sensing bulb 122 is normally collected in that portion of the refrigeration system where liquid should not be present. However, should liquid be present in that system, it will be sensed by the bulb 122 and the compressor will be shut down.

The full relevance of the foregoing described circuit can best be understood by a description of the operation for an air conditioning application. Thus, to charge freon into an air conditioning system, the following procedure should be followed. The vacuum is broken and a proportional amount of liquid refrigerant is put into the discharge side of the unit. This is standard procedure. Thereafter, charging unit connections on the low pressure and high pressure side are made. Switch 60 is moved to the air conditioning charging position. All refrigerant lines are purged of air and the ambient temperature sensing bulb 42 is positioned adjacent to the system. Moreover, adjustments are made for the temperature differences between the existing ambient temperature and the desired ambient temperature.

Thereafter, the system is operated for charging in the normal manner. When either light 62 or 64 comes on, the system is accurately charged to the correct head pressure as specified by the manufacturer.

If during the charging operation, light 58 comes on, this is an indication that there is some defect in the air conditioning unit. For example, the freon could have stopped flowing or be reduced in its rate of flow. The problem could be caused by any one of those known to those skilled in operating and recharging refrigeration systems. For example, the problem could be in the evaporator section and could be caused by restricted air flow, a dirty evaporator, a failure of the evaporator fan, or improper tube size.

During the initial stage of charging, light 58 may be illuminated. This could happen if pressure from the supply tank is low due to frosting on the tank. To remedy this, the tank can be placed in warm water. Stated otherwise, a higher pressure must be present in the tank than in the suction side of the unit. At the end of the charging period and at the time full charge light 62 or 64 comes on, such suction pressure warning light 58 must be out. If it is not, then it indicates that one of the following problems could exist: improper unit size for building structure; restriction in the cap tube; restricted air flow; air or non-condensable material in the unit.

If light 62 or light 64 comes on indicating a full charge and no other warning lights are illuminated, the unit is fully charged and the charging unit can be removed.

For operation of the unit for a refrigerator, the vacuum is broken and a proportional amount of liquid refrigerant is put in the discharge side of the unit. This is standard procedure. Thereafter, charging unit connections on the low pressure and high pressure side of the system are made. Selection switch 60 is positioned for refrigeration charging. Thereafter, the refrigeration lines are purged of air and the ambient air sensing bulb 42 is positioned to sense ambient air temperature or water temperature depending upon coolant used for the refrigeration system. Temperature differential adjustment is made and the liquid return sensing bulb 122 is correctly positioned. Thereafter, the freon tank is turned on, master switch 54 is closed, and the refrigeration unit is started.

When either light 62 or light 64 comes on, the unit is accurately charged to the correct head pressure as specified by the manufacturer. If light 124 comes on at any time during the charging period, this is an indication that there is a defect in the refrigeration or air conditioning unit. Such defect could be a restricted air flow; a dirty evaporator; evaporator fan off; or improper cap tube size. Because of the vast number of temperature requirements in different refrigeration unit applications, the suction side of the compressor must be checked with the gauge. It is not within the scope of this unit as described herein to sense and indicate suction pressure problems.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for monitoring the charge of a refrigeration system comprising a control valve for controlling the flow of refrigerant into the system, and means for controlling the operation of the control valve by sensing pressure and temperature, said means comprising an expansible device connected to the head pressure, an expansible device connected to the suction pressure of the system, and an expansible device connected to the ambient air sensing system, and switch contact elements physically connected to each of said expansible devices and positioned in relation to each other to make or not make electrical contact in accordance with pressure and ambient air temperature in the system.

* * * * *